United States Patent [19]

Seaborne et al.

[11] Patent Number: 4,661,359
[45] Date of Patent: Apr. 28, 1987

[54] COMPOSITIONS AND METHODS FOR PREPARING AN EDIBLE FILM OF LOWER WATER VAPOR PERMEABILITY

[75] Inventors: Jonathan Seaborne, Corcoran; David C. Egberg, Plymouth, both of Minn.

[73] Assignee: General Mills, Inc., Minneapolis, Minn.

[21] Appl. No.: 740,797

[22] Filed: Jun. 3, 1985

[51] Int. Cl.$^4$ ............................................. A23P 1/08
[52] U.S. Cl. ................................... 426/89; 426/138; 426/273; 426/392; 426/415; 426/92; 426/103; 426/101; 426/102
[58] Field of Search ............... 426/138, 139, 272, 273, 426/274, 275, 279, 282, 392, 395, 810, 811, 415, 89; 106/200; 427/2, 372.2; 424/33, 34, 92, 103, 101, 102

[56] References Cited

U.S. PATENT DOCUMENTS 2,811,453 10/1957 Childs .
2,816,061 12/1957 Doerr et al. .
2,909,434 2/1966 Patten et al. .
2,951,763 4/1966 Kelly et al. .
3,043,747 7/1962 Long .
3,141,778 7/1964 Thompson et al. .
3,145,111 3/1966 Norton .
3,157,518 11/1964 Battista .
3,248,232 4/1966 Krajewski .
3,323,922 6/1967 Durst .
3,382,078 5/1968 Melio et al. .
3,390,049 6/1968 Rednick et al. .
3,471,303 10/1969 Hamdy et al. .
3,560,222 2/1971 Delaney .
3,576,663 4/1971 Signorino et al. .
3,741,795 6/1973 Signorino .
4,396,633 8/1983 Tresser .
4,401,681 8/1983 Dahle .

FOREIGN PATENT DOCUMENTS 43-6435 4/1968 Japan ......................... 106/200

OTHER PUBLICATIONS

Kamper et al., 1984, Water Vapor Permeability of an Edible Fatty Acid, Bilayer Film, J. Fd. Sci. 49:1482.
Kamper et al., 1984, Water Vapor Permeability of Films, J. Foods Sci. 49:1481.
Kamper et al., 1985, Use of an Edible Film to Maintain Water Vapor Gradients in Foods, J. Food Sci. 50:382.
Rose et al., 1966, The Condensed Chemical Dictionary, Seventh Edition, Reinhold Publishing Co., New York, pp. 496 and 859.
"Dictionary of Food Ingredients" by Robert S. Igoe, Van Nostrand, Reinhold Co., 1983, pp. 69–70.

Primary Examiner—Raymond N. Jones
Assistant Examiner—Carolyn Paden
Attorney, Agent, or Firm—John A. O'Toole

[57] ABSTRACT

Disclosed are edible film coating compositions of low moisture permeability and their methods of preparation. The compositions comprise cross-linked, refined shellac and hydroxypropyl cellulose (HPC) in a weight ratio of 1:0.001 to 1:2. Highly preferred compositions additionally comprise mono- or di-carboxylic acid adducts such as adipic, succinic, lauric, or stearic acids in a weight ratio of acid to combined weight of shellac and cellulose of 1:33 to 1:10. In the preferred method of preparing, the shellac is cross-linked in a dry, molten mixture with the HPC by heating at 130° to 175° C. for 2 to 15 minutes. The coating compound while molten is dissolved in a food grade solvent, applied to a substrate, and dried. The coating compositions are particularly useful as a moisture barrier in composite food articles having phases in contact which differ substantially in water activity. Effective films range from 0.1 to 5 mils in thickness.

37 Claims, No Drawings

COMPOSITIONS AND METHODS FOR PREPARING AN EDIBLE FILM OF LOWER WATER VAPOR PERMEABILITY

BACKGROUND OF THE INVENTION

1. Technical Field

The present invention relates to food products and to their methods ot preparation. More particularly, the present invention relates to edible food coating compositions comprising cross-linked shellac and to their methods of preparation.

2. The Prior Art

Although the coating of food to protect such food against oxidative degradation, microbial attack, and moisture penetration is well known, most coatings employed for such purposes are not edible and must be removed before the food can be consumed. If the coating employed adheres well to the the food product, the removal of such coating can be difficult and time consuming. Additionally, if the food product is brittle and fragile, the food product can break during the stripping of the coating, making the consumption of the food difficult and resulting in the loss of the food product. An edible food coating which does not require removal prior to consumption of the food product and which affords the necessary protection, particularly against moisture penetration, is therefore highly desirable.

A particular problem exists in the protection of food products with edible coatings or barriers with respect to composite foods comprising phases of dissimiliar materials, e.g., ice cream sandwiches or cheese and crackers, whose composite phases may differ in such properties as water activity, acidity, protein level and the like. Due to the various gradients in water activity, (as described in "Moisture Sorption," T. P. Labuya, American Association of Cereal Chemists, St. Paul, Minn. 1984) and the like between the phases as well as the physical contact, migration and/or diffusion of species between the phases can occur which can result in degradation of the properties of each phase. For example, moisture may migrate from the cheese to the cracker undesirably drying the cheese and at the same time undesirably reducing the crispness of the cracker. Furthermore, removal of any intermediate barrier material can be quite inconvenient.

Among the various potential gradients in such composite food articles, moisture migration remains the most significant problem area. While throughout the remainder of the specification below, particular attention is addressed to the problems of moisture migration and moisture penetration of coating or barrier compositions, the skilled artisan will appreciate that the present invention also finds usefulness in the problems associated with additional migration or penetration problems including oxygen, acidity, flavor, color, oil and protein.

In the past, the art has attempted to prepare composite food articles by formulating the different food phases so that the water activity of the phases were approximately the same so as to minimize moisture migration. However, not only does this limit the range of composite food products possible, but moisture migration and solute diffusion problems remain nonetheless. One approach towards providing an edible, low water permeable barrier has been to formulate barriers based upon compound fats and formed in-situ gel membranes (as described in U.S. Pat. No. 4,396,633, issued Aug. 2, 1983 to Tresser and U.S. Pat. No. 4,401,681, issued Aug. 30, 1983 to Dahle). However, such barrier or coating compositions suffer from numerous disadvantages. Among the problems is that in order for compound fat coatings or barriers to be effective over long periods of time, the fat coatings must be relatively thick. Additionally, especially with regard to chilled or frozen food articles, the fat barriers become relatively brittle at these reduced temperatures. Fissures or cracks may occur breaching the integrity of the barrier and allowing moisture migration to occur. Also, the fat coatings may be organoleptically undesirable providing a noticeable presence in an undesirably waxy mouthfeel especially at reduced consumption temperatures.

The prior art additionally includes attempts at providing edible coating compositions of low water permeability which are effective as relatively thin films. Coating compositions based upon modified methyl or ethyl cellulose ether are known (see U.S. Pat. Nos. 3,471,304 and 3,471,303, each issued Oct. 7, 1969 to M. M. Handy et al.). Additionally, coating compositions based upon shellac are also known (see U.S. Pat. No. 3,741,795, issued June 26, 1973 to C. A. Signorino). However, the compositions of each of these two references suffer from several disadvantages. First, each of the food compositions, while designated as edible, typically include ingredients which are not approved by the Food and Drug Administration. Additionally, while the coating compositions may provide a measure of water impermeability, further improvements in this important attribute are desirable. Also, the '304 patent teaches the necessity of employing both acylated fatty glycerides and certain metal salts.

The present invention resides, in part, in the preparation of new edible food coating compositions by incorporating into the molecular structure of shellac resin, a hydroxypropyl cellulose, ("HPC" is a cellulose ether containing propylene glycol groups attached by an ether linkage which contains, on an anhydrous basis, not more than 4.6 hydroxypropyl groups per anhydro glucose unit) and hydroxypropyl methyl cellulose, ("HPMC" is a cellulose ether containing propylene glycol and methyl groups attached by an ether linkage) either singly or in combination and with or without the addition of an acid catalyst.

The invention is suitable for commercial operations and provides compositions which have improved properties in the edible food coating fields. The compositions of the present invention may be prepared in the form of pre-polymerized or baked-on films depending on the heat tolerance properties of the substrate coated. After air drying or curing the film possesses excellent oil, water and aging resistance and unusual toughness and elasticity or flexibility. Various other outstanding properties will be apparent from the following description of the compositions of the present invention disclosures.

When small molecules diffuse through a polymer membrane, the rate of permeation can be expressed by parameters which may be characteristic of the polymer. The general concept of the ease with which a permeant passes through a barrier or the ease with which an intact material can be penetrated by a given gas or liquid is often referred to as "permeability." This general term "permeability" does not refer to the mechanism or imply anything about the mechanism of the permeation but only to the rate of the transmission or transport.

Membranes or films are generally described as permeable, semi-permeable (permeable to some substances but not to others), or perm-selective (permeable to different extents to different molecular species under equal driving force). Consequently, a given membrane may be described by any one of these terms depending upon the nature of the penetrant or penetrants being studied (e.g., cellulose is permeable to water, perm-selective to water-glucose solutions and semi-permeable to water-protein solutions).

The terms permeability and permeability coefficient are defined in various ways by different authors, particularly when they are involved in different areas of research. The skilled artisan obtaining permeability information from the literature must therefore look carefully at the units of the permeability constants and the method of measurement. The permeability coefficient P is generally the proportionality constant between the flow driving force per unit thickness of membrane. In the literature, however, one also finds flow per time, flow per area per time, or flow per area per time per unit thickness, all under the general term permeability. In the latter cases, the permeability coefficient may be an intrinsic property of the membrane, or it may be only a phenomenological property dependent on experimental conditions during measurements.

For purposes of illustration in Table 1 below, the permeability to water vapor or, synonymously, the water vapor permeability constants of a number of different non-edible polymer films are listed (as reported in "Permeability of Plastic Films and Coated Paper to Gases and Vapor," V. Stannett, et al., TAPPI Monograph Series No. 23, 1963, and "Polymer Handbook," H. Yasuda, and V. Stannett, John Wiley and Sons (Interscience Division), New York, III-229-240, 1975.), and serves as a guide to the current capabilities of overwrap packaging film water vapor permeability.

TABLE 1

| Film | Thickness* | Water Vapor Permeability** |
|---|---|---|
| Low density polyethylene | .0022 | 7.3 |
| High density polyethylene | .0045 | 35 |
| Polyvinylidene chloride (Saran) | .0025 | 0.05 |
| Polyacrylonitrile | N.A. | 30 |
| Cellulose acetate (unplasticized) | N.A. | 680 |
| Polystyrene | N.A. | 120 |
| Ethyl cellulose | N.A. | 1200 |

*thickness in inches
**units $[cm^3(STP)cm^{-2}sec^{-1}(cmHg)^{-1}cm \times 10^{-9}]$ in the above table, while exemplary film thickness are given for illustration of typical use film thickness, the water vapor permeability values are intrinsic to the materials and independent of thickness.

Also for purposes of illustration, examples of several edible films not within the scope of the present invention comprising ordinary shellac, cellulose derivatives and/or simple mixtures thereof and other currently available food approved film formers or coatings are listed in Table 2 along with their water vapor permeability constants as determined by methodology outlined in ASTM E96-66 (Reapproved 1972).

TABLE 2

| Film | Thickness* | Water Vapor Permeability** |
|---|---|---|
| Hydroxypropyl methyl cellulose | .002 | 49,280 |
| Hydroxypropyl cellulose | .002 | 873 |
| Zein-Corn protein | .0004 | 168 |
| Paraffin wax on citrus fruit[A,B] | .0011 | 10 |
| Shellac-bleached | .0005 | 90 |
| Shellac-unbleached | .0012 | 81 |
| Shellac-HPMC (heat treat) | .0003 | 38 |
| Shellac-HPC (heat treat) | .0003 | 43 |

*thickness in inches
**units $[cm^3(STP)cm^{-2}sec^{-1}(cmHg)^{-1}cm \times 10^{-9}]$
[A] use limited by 21 CFR 172.275 (i.e., the Code of Federal Regulations, Vol. 21, §172.275) 1984.
[B] W. M. Miller and W. Grierson, Transactions of the ASAE, 1884-1887, 1983.

Ordinary shellac and cellulose derivatives have been used in or as a glaze in the pharmaceutical and confectionary industries. Food grade shellacs and/or cellulose derivatives are dissolved in ethyl alcohol and used for coating tablets and confections by panning, spraying, brushing or curtain coating methods. However, pure cellulose derivatives generally are poor coatings as they impart a lubrious texture when dissolving, exhibit minimal flexibility and generally provide poor water impermeable coatings. Additionally, known coating compositions based upon pure bleached shellac suffer from other disadvantages as well. Noticeable off-flavors can be associated with shellac. While these problems are of less concern in the fabrication of orally administered medicines or vitamins, such problems are significant in other types of food products. Additionally, while known shellac based coatings initially offer good moisture impermeability, such coatings tend to swell in the presence of moisture over time. As the coatings swell and absorb moisture, the barrier properties deteriorate. Thus, there is a continuing need for improved shellac based coating compositions with extended shelf life due to decreased susceptibility to swelling in the presence of moisture. Accordingly, it is an object of the present invention to provide edible coating compositions with improved moisture impermeability.

It is a further object to provide coating compositions having improved resistance to water swelling.

Another object of the present invention is to provide coating compositions which contain neither non-food approved ingredients nor metal salts of fatty acids.

Still another object is to provide methods for preparing such coating compositions.

It is an object of the present invention to provide methods for preparing such coating compositions which can be used with heat-sensitive substrates.

SUMMARY OF THE INVENTION

The present invention relates to coating compositions, to both pre-application and post-application methods of preparation, and to coated articles fabricated from the compositions. The coated compositions are based upon heat cured shellac and provide superior coatings or barriers to moisture and oxygen penetration as well as improved resistance to moisture swelling.

The coating compositions essentially comprise shellac and hydroxypropyl cellulose ("HPC"). The ratio of shellac to HPC or HPMC essentially ranges from 1:0.001 to 1:2. The ratio of acid catalyst to combined weight of shellac and HPC ranges from about 1:400 to 1:10. Suitable acid catalysts include citric, malic, hydrochloric and tartaric acids.

The preferred method for preparing the coating compositions involves firstly dry blending the ingredients. Next, the blend is heated in a dry state to 130° to 175° C. for a period of 2 to 15 minutes. While molten, the heat cured composition is dissolved in a food grade solvent. The solution is then applied to a substrate and the coated substrate is allowed to dry.

The coated food articles of the present invention can be prepared by applying the coating composition to a food substrate, preferably diluted in a food grade solvent and thereafter dried to form a film. The film can range from 0.1 to 5 mil in thickness.

DETAILED DESCRIPTION OF THE INVENTION

The present invention relates to edible coating compositions, to their methods of preparation, and to coated food products. The coating compositions essentially comprise shellac and hydroxypropyl cellulose and/or hydroxypropyl methyl cellulose. Preferred embodiments additionally comprise shellac and certain mono- and di-carboxylic acids and/or acid catalysts. Each of these essential and preferred components as well as product preparation and use are described in detail below.

Throughout the specification and claims, percentages and ratios are by weight and temperatures in degrees Fahrenheit, unless otherwise indicated.

Shellac

Shellac is the principal component of the present coating compositions. Shellac essentially comprises about 25% to 99.9% of the compositions. Better results in terms of both low moisture permeability and film flexibility are obtained when the shellac comprises about 50% to 99.9% of the composition. Best results are obtained when the shellac comprises about 58% to 99.9% of the coating compositions.

Shellac or lac is a naturally occurring resin of animal origin. The chemical nature of shellac is still not completely understood. It is known that shellac is a resinous material analogous to polyesters formed as a natural condensation product of aleuritic acid (9, 10, 16-trihydroxy palmitic acid) and schellolic acid. It has free carboxyl, hydroxyl and aldehyde groups and is unsaturated. When considering the properties of shellac, it must be remembered that shellac is a natural product of animal origin and differs somewhat from one source to another whether from India, Thailand or other areas.

Due to these groups and its chemical nature, shellac is known to age or polymerize with itself. Uncontrolled polymerization makes a shellac film less alcohol soluble and water permeable, but also undesirably increases the brittleness of a shellac film and lessens its usefulness as a coating.

Generally, shellac contains about 67.9% carbon, 9.1% hydrogen and 23.0% oxygen, which corresponds to an empirical formula of $(C_4H_6O)_n$. Investigations into the number average molecular weight ($M_n$) of fresh or unreacted shellac have concluded it to be about 1000 units. Based on this, the average shellac molecule has an average n=15 and ranges from n=6 to n=22 (as described by W. H. Gardner, W. F. Whitmore and H. J. Harris, Ind. Eng. Chem. 25,696(1933) and S. Baser, J. Indian Chem. Soc. 25,103(1948)). The average molecule contains one free acid group, three ester linkages, five hydroxyl groups and possibly a free or potential aldehyde group as indicated by acid value, hydroxyl values, saponification value and carboxyl value determinations.

Shellac, of course, is an old and well known material and shellacs are commonly treated in various well known ways to modify its properties. Not all shellacs used in other food applications can be used herein. Generally, it is essential to the present invention to use only dewaxed, filtered, carbon black decolorized shellac. Highly preferred for use herein is "virgin" (i.e., nonchemically modified) shellac. Ammoniated shellac may also be used in certain instances as explained in more detail below. However, ammoniated shellac is not preferred for use herein. It has been surprisingly found that other refined or bleached shellacs do not possess the reactivity required to cross-link so as to be useful in the present invention. Suitable shellacs have been obtained from Kane International, Larchmont, N.Y.

Hydroxypropyl Cellulose

Hydroxypropyl cellulose or ("HPC") is the second principal essential component employed in forming the present coating compositions. A closely related material, hydroxypropyl methyl cellulose ("HPMC") can be used in full or partial replacement for HPC. As little as a 0.001:1 weight ratio of HPC to shellac has been found to be helpful in adding flexibility and moisture vapor permeability reduction to the shellac film and as much as a 2:1 ratio of HPC to shellac has been found to give good moisture vapor impermeability to the shellac film without losing the desirable sealing characteristics of the shellac film. Higher quantities of HPC can produce films which are more sensitive and moisture permeable. For better results, the HPC can be present at a weight ratio of about 0.05 to 0.1:1 to shellac in the compositions.

HPC is a type of cellulose ether. The use of cellulose ethers in food coating compositions is well known. Cellulose ethers, by themselves, however, are generally considered to be unsuitable for coating in view of their brittleness or lack of resiliency, flexibility, and plasticity and, most importantly for some, water solubility. HPC and HPMC are highly water soluble and, undesirably, have a relatively high water permeability. Plasticizers which have heretofore been employed in combination with the cellulose ethers are either of the non-edible type or, if edible, have detracted from the thermal stability and barrier properties of the cellulose ether. Additives are generally to be avoided for inclusion which have previously been suggested for cellulose ether coating compositions; these have included glycerin. propylene glycol, polyoxyethylene compounds, glycerol monostearate, acetylated monoglycerides of fatty acids or acylated fatty glycerides. Thus, preferred for use herein are those films which are substantially free (i.e., contain less than about 0.5% dry weight) of such materials.

The cellulose ethers employed in the coating composition of the present invention are edible cellulose ethers containing between 2.1 and 2.7 ether groups per glucose unit in the cellulose polymer chain. Published information suggests that the hydroxypropyl substituent groups contain almost entirely secondary hydroxyls and that most of the primary hydroxyl in the cellulose have been substituted. It is the secondary hydroxyls that are the reactive groups remaining. Typical molecular weights for the hydroxypropyl celluloses range from 60,000 to 1,000,000 and hydroxypropyl methyl celluloses from 13,000 to 120,000.

While the precise phenomenon is not understood, the HPC or HPMC cannot be replaced with equivalent amounts of either methyl or ethyl cellulose. Such substitutions undesirably result in compositions forming films which are brittle and highly water vapor permeable. While not wishing to be bound to the proposed explanation, it is speculated that the hydroxy moieties of HPC are relatively more amenable to forming ester linkages with the shellac than are other types of cellulose ethers.

Optional Ingredients

While effective films can be prepared herein from shellac and HPC alone, it has been surprisingly discovered that various other components can be added which modestly improve one or more properties of the film, especially water impermeability and flexibility, and film hardness. Each of these classes of materials are organic compounds having reactive hydroxy moieties.

Materials useful herein include mono- and di-carboxylic acids, vanillin, anisaldehyde, cocoa butter, acetylated mono-glycerides, distilled mono-glycerides and polyglycerol fatty acid esters and mixtures thereof.

Especially useful herein are all edible non-substituted mono- and di-carboxylic acids. The skilled artisan will have no problem selecting particular acids for use herein. Preferred reactant materials due to their cost, flavor, availability and favorable affect on film flexibility, water durability and permeability are selected from the group consisting of adipic acid, succinic acid, oleic acid, lauric acid, stearic acid and mixtures thereof. Preferred for use herein are stearic acid, lauric acid, adipic acid and mixtures thereof. The reactants modestly increase the moisture impermeability of the films. Additionally, the organic acids in part help mask off-flavors associated with shellac.

If employed, these adjuvent materials can be present in the coating compositions in a weight ratio of reactant to combined weight of shellac and HPC ranging from about 0.0001:1 to 0.25:1, (i.e., at a concentration (dry basis) of 0.01% to 25%). Better results are obtained employing weight ratios of about 0.001:1 to 0.1:1, (i.e., at a concentration of 0.1% to 10%). For best results a ratio of about 0.02:1 is employed.

Additionally, additives which reduce the growth of microorganisms can be incorporated into the described coating compositions especially when the compositions are to be used for providing protective films on external surfaces. Such additives or preservatives include sorbic acid, potassium sorbate, methyl p-hydroxybenzoate, sodium benzoate, sodium propionate, and propyl p-hydroxybenzoate. The addition of even small concentrations of such preservatives results in a marked improvement in reducing or preventing the growth of microorganisms. Adequate protection against the growth of microorganisms is obtained if the concentration of the preservative in the coating constitutes about 0.01% to 0.2% by weight of the coating. In addition, suitable anti-oxidants approved for food use can be included in the coating compositions.

Method of Preparation

The present coating compositions are obtained by blending the components and heat curing in a dry state. The heat curing can be practiced as convenient either before or after application to the desired substrate. The blending can be done either by dry blending or by dissolving in a solvent and thereafter removing the solvent. The process of this invention produces a chemical union between all the reactants, with the shellac forming an integral part of the resulting resinous molecules.

The most highly preferred method is the preapplication curing embodiment. This method is preferred due to the realization of films which are more highly water-impermeable and resistant to water swelling. The components are first dry blended to form a homogeneous mixture. If desired, such formulated unreacted compositions may themselves be marketed on a supplier basis. The order in which the components are admixed is not critical. Thereafter, the dry blend is heated to about 130° to 175° C., preferably 138° to 150° C. for a period of about 2 to 15 minutes, preferably about five to ten, to form the present heat cured coating compositions. Temperatures in excess of 175° C. cause too rapid and uncontrollable polymerization with the resulting material being insoluble in ethanol and other food approved solvents.

While still molten, the melt or magma is poured into a food grade solvent such as ethyl alcohol with agitation. If allowed to cool to solidification, the heat cured, cross-linked shellac based resin products which comprise the present compositions are not readily soluble. However, if desired, the cured resin product may be allowed to solidify and then be reheated as convenient for dissolution into the solvent.

An acid catalyst is not essential in this embodiment of the method of preparation as in the to-be-described post application technique. Indeed, excessive acidity can cause the reaction to proceed at an uncontrolled rate resulting in an unusable reaction product. In the undiluted form, the shellac itself has sufficient acidic character to initiate polymerization upon simple heating.

Within the above given reacton parameters, it is desirable to produce cross-linked shellac having a molecular weight ranging from about 2,000 to over 1,000,000 if HPC or HPMC is used in conjunction with the shellac, as determined by Gel Permeation Chromatography. These pre-application curing methods are particularly useful when coatings are desired to be applied to heat sensitive materials, e.g., materials of low melting point ingredients and having particular shapes, e.g., chocolate chips. The solution may also be removed to provide resins for the coating compositions.

The coating compositions realized herein are thermoplastic resins. The compositions thus can be used for curtain coating techniques of food coating, i.e., involving the extrusion of a sheet which is placed over the substrate with the aid of suction while still molten. The described coating compositions, however, are particularly suitable for use in conventional coating techniques such as dipping, brushing or spraying. These operations can be conducted employing a melt of the coating composition or by employing solutions thereof in food grade solvents.

Another suitable method of preparation is to cure after application to a substrate. In this embodiment, the components are dissolved in a food grade solvent, e.g., water, ethyl acetate and ethanol mixtures, to form preferably a 10% to 20% solution along with an acid catalyst. Among food grade solvents, ethanol is the solvent of choice. Shellacs are not generally readily soluble in water. However, certain ammonia treated shellacs are more easily dissolved in water. Also, when water is sweetened with ammonia to a pH of 8.5 to 9.0, shellacs can be dissolved in the water. Modest additions of alcohol to water can be used, if desired, to disperse the optional mono- and di-carboxylic acid materials in the alkaline water. Of course, HPC and HPMC are readily dispersible in water. The aqueous solution can be applied to a substrate and allowed to dry. Thereafter, a solution containing the acid catalyst can be applied over the dried film of unreacted reactants. Increased amounts of acid catalyst should be employed so as to first neutralize the residual alkalinity. Thereafter, the coated substrate can be heat treated as described further below.

An edible acid catalyst is essentially employed in this embodiment of forming the present coating compositions. The acid catalyst allows for the accelerated and controlled cross-linking of the shellac and other materials. Suitable for use herein are both edible mineral and organic acids. The useful organic acid catalysts herein are distinguished from the organic acid reactants principally by the realtively greater acidity of the acid catalyst materials. Exemplary materials useful herein for the acid catalyst includes citric acid, tartaric acid, phosphoric, tannic, hydrochloric acid, malic acid and mixtures thereof. Preferred for use herein are citric acid and hydrochloric acid.

The acids are used in amounts effective to promote the cross-linking of the shellac. Since the cross-linking step is practiced in a dry state, conventional pH measurements of acidity are inappropriate. However, good results are obtained when the weight ratio of acid catalyst to the combined weight of shellac and HPC ranges in the dry compositions from about 0.001 to 0.1:1. Thus, the reactant solutions from which the pre-heat cured films are prepared can contain about 0.1% to 10%, preferably about 0.25% to 5% of the acid catalyst member(s). Best results in terms of optimum hardness and permeability are obtained when the solution concentration of acid catalyst ranges from 0.5% to 3%.

The solution is then applied by conventional techniques to a substrate to form a coated substrate and dried. The coated substrate is then heated for 2 to 15 minutes at 130° to 180° C. to cure the coated composition. Slightly longer heating times may be required to bring the temperature to within the above temperature range if the coated substrate has not been completely dried prior to heating. After the heat curing step, the substrate will be covered with the coatings of the present invention. This embodiment is particularly useful for use with substrates which are heat tolerant, e.g., baked goods or container materials.

Of course, additional layers may be applied to the substrate if desired to increase further the sealing properties of the coating. The coating obtained with the described coating compositions are strong, highly water and oxygen impermeable, resistant to swelling, flexible and resilient even at freezer temperatures. Even in the form of thin films, continuous, pin-hole-free coatings are readily obtained.

The optimum thickness of a coating employing the present compositions will vary depending on the particular application involved, the degree of protection desired, and the expected storage environment. As a general rule, the coating should have sufficient thickness to assure a continuous coating and give the desired degree of protection, and whether or not it is desirable for the barrier not to be readily apparent. Good sealing protection can be achieved with a coating thickness as thin as 0.25 mil. Greater protection, while nonetheless being organoleptically acceptable, can be provided by films up to about 5 mil in thickness. Preferred thicknesses range from about 0.5 to 2 mil.

The coating compositions can be used on all manner of substrates used in connection with food products whether non-edible, e.g., on containers, sticks and the like, or edible substrates, e.g., fruits, vegetables, meats, candies, baked goods, tablets for oral use and the like. The present coating compositions find particular usefulness as barriers in composite food products having a first food phase or region of one material and a second phase or region of a second material. For example, pieces of soft, moist cheese may be coated with the present film coat and sandwiched between dry cracker slices to provide conventionally packaged snacks which are not subject to staling as quickly by moisture migration or other interaction between the cheese and cracker. Surprisingly, the present coatings find even greater usefulness with high moisture, frozen or chilled food products such a ice cream sandwiches or pies.

The invention is further illustrated by the following examples.

EXAMPLE 1

Two grams hydroxypropyl cellulose (m.w. 1,000,000) and 1 gram of dewaxed, carbon filtered shellac were dissolved in 200 ml 95% ethanol and warmed slightly to about 125° F. to effect solution with stirring. Upon complete solution, 0.5 ml 85% phosphoric acid was added with stirring. The solution was spread upon a teflon plate and heat cured at 300° F. (150° C.) for 15 minutes. The resulting film had no appreciable water solubility at 70° F. with rubbing and did not exhibit cracking or lifting from the teflon substrate when flexed.

EXAMPLE 2

Ten grams of hydroxypropyl cellulose (m.w. 100,000) and 10 grams of dewaxed, carbon filtered shellac were dissolved in 100 ml 95% ethanol and warmed to 125° F. to effect solution with stirring. Upon solution, 5 ml of a concentrated citric acid solution (35 g in 80 ml 95% ethanol) was added. The solution was cast on teflon, glass and vegetable paper substrates and heat cured at 300° F. (150° C.) for 10 minutes. The resulting films were water resistant, exhibited no water swelling and no stress cracking when flexed. Dried coating weight was 0.028 g in −2.

EXAMPLE 3

Ten grams of hydroxypropyl cellulose (m.w. 100,000) and 10 grams of dewaxed, carbon filtered shellac were dissolved in 100 ml 95% ethanol and warmed to 125° F. to effect solution with stirring. Upon solution, 0.5 g of a concentrated tannic acid solution (8 g in 80 ml 95% ethanol) was added. The solution was cast on teflon, glass and vegetable paper substrates and heat cured at 300° F. (150° C.) for 10 minutes. The resulting films were water resistant, exhibited no water swelling and no stress cracking when flexed.

EXAMPLE 4

Ten grams of hydroxypropyl cellulose (m.w. 100,000) were dissolved in 50 ml of 95% ethanol. Ten grams of dewaxed, carbon filtered shellac were dissolved in 50 ml of 95% ethanol and warmed to 125° F. to effect solution with stirring. To the shellac solution was added 0.6 grams stearic acid. Upon solution, the 50 ml of hydroxypropyl cellulose in ethanol was added with mixing to the shellac, stearic acid solution. One percent (0.2 g) concentrated HCl was added to the mixture. The solution was cast on a vegetable parchment and baked at 350° F. (163° C.) for 10 minutes. The resulting film was lemon yellow in color, flexible and resistant to abrasion by water rubbing.

EXAMPLE 5

Ten grams of hydroxypropyl cellulose (m.w. 100,000), 2.0 g adipic acid and 10 grams of dewaxed, carbon filtered shellac were dissolved in 100 ml 95% ethanol and warmed to 125° F. to effect solution with stirring. Upon solution, 0.2 g of a concentrated citric acid solution (35 g in 80 ml 95% ethanol) was added. The solution was cast on teflon, glass and vegetable paper substrates and heat cured at 300° F. (150° C.) for 12 minutes. The resulting films were water resistant, exhibited no water swelling and no stress cracking when flexed.

EXAMPLE 6

One hundred grams of dewaxed, carbon filtered shellac were placed in an oil jacketed heating vessel along with 10 grams hydroxypropyl cellulose (m.w. 100,000) and heated to 135° C. Upon reaching temperature the reaction was run for eight minutes with stirring. The magma or molten mixture was stiff with a final temperature of 143° C.–148° C. The molten mixture or magma was poured into 900 ml of a 10:1 mixture of 95% ethanol and ethylacetate with high shear mixing and upon solution was diluted to one liter.

EXAMPLE 7

One hundred grams of dewaxed, carbon filtered shellac were placed in an oil jacketed heating vessel along with 5 g hydroxypropyl cellulose (m.w. 100,000) and heated to 135° C. Upon reaching temperature the reaction was run for eight minutes with stirring. The magma or molten mixture was stiff with a final temperature of 143° C.–148° C. The molten mixture or magma was poured into 900 ml of a 10:1 mixture of 95% ethanol and ethylacetate with high shear mixing and upon solution was diluted to one liter.

EXAMPLE 8

One hundred grams of dewaxed, carbon filtered shellac were placed in an oil jacketed heating vessel along with 20 grams hydroxypropyl cellulose (m.w. 100,000) and heated to 135° C. Upon reaching temperature the reaction was run for eight minutes with stirring. The magma or molten mixture was stiff with a final temperature of 143° C.–148° C. The molten mixture or magma was poured into 900 ml of a 10:1 mixture of 95% ethanol and ethylacetate with high shear mixing and upon solution was diluted to one liter.

EXAMPLE 9

One hundred grams of dewaxed, carbon filtered shellac were placed in an oil jacketed heating vessel along with 10 grams hydroxypropyl methyl cellulose (m.w. 26,000) and heated to 135° C. Upon reaching temperature the reaction was run for eight minutes with stirring. The magma or molten mixture was stiff with a final temperature of 143° C.–148° C. The molten mixture or magma was poured into 900 ml of a 10:1 mixture of 95% ethanol and ethylacetate with high shear mixing and upon solution was diluted to one liter.

EXAMPLE 10

Five hundred grams of dewaxed, carbon filtered shellac were placed in an oil jacketed heating vessel along with 100 grams of hydroxypropyl cellulose (m.w. 100,000) and heated to 135° C. Upon reaching temperature the reaction was run for 7.5 minutes with stirring. The magma or molten solution was stiff with a final temperature of 143°–148° C. The molten mixture or magma was poured into 4500 ml of a 10:1 mixture of 95% ethanol and ethyl acetate with high shear mixing and upon solution was diluted to 1 liter.

EXAMPLE 11

One hundred grams of dewaxed, carbon filtered shellac were placed into an oil jacketed heating vessel along with 10 grams of hydroxypropyl methyl cellulose, 5 HCl acid solution and heated to 135° C. The excessive acidity caused the reaction to proceed at an accelerated rate in an uncontrollable manner. The resulting reaction product was not soluble in alcohol.

The water vapor permeabilities of the edible films prepared as in the above examples as well as pure unheat cured shellac have the values provided in Table 3 as follows.

TABLE 3

| WATER VAPOR PERMEABILITIES FOR SHELLAC FILMS | |
|---|---|
| FILM COMPOSITION | $H_2O$ VAPOR PERMEABILITY* |
| Shellac-unbleached, | 20.0 |
| Hydroxypropyl cellulose | 87.3 |
| Hydroxypropyl methyl cellulose | 4928.0 |
| Example 1 | (not measured) |
| Example 2 | 4.3 |
| Example 3 | 7.8 |
| Example 4 | 7.0 |
| Example 5 | 10.4 |
| Example 6 | 3.4 |
| Example 7 | 4.1 |
| Example 8 | 5.1 |
| Example 9 | 3.8 |
| Example 10 | 5.1 |
| Example 11 | N/A |

*units [$cm^3(STP)cm^{-2}sec^{-1}cmHg^{-1}cm \times 10^{-9}$]

The values given in Table 1 above indicate that compared to untreated shellac or HPC or HPMC, the present films exhibit superior resistance to moisture permeability. It is to be appreciated that in the above table that the water vapor permeability values account for differences in film thickness so that the properties of the materials themselves can be conveniently compared.

What is claimed is:

1. A method for preparing an edible low water vapor permeable film, comprising the steps of:
    A. dissolving in an edible solvent to form a mixed solution
        1. unbleached, refined edible shellac, and
        2. a first reactant member selected from the group consisting of hydroxypropyl cellulose, hydroxypropyl methyl cellulose and mixtures thereof,
            wherein the weight ratio of edible shellac to member ranges from about 1:0.001 to 1:2,
            wherein the concentration of the solution ranges from about 1% to 30% by weight,
            wherein said solution additionally comprises an acid catalyst selected from the group consisting of citric, tartaric, hydrochloric, malic and mixtures thereof, and wherein the weight ratio of acid catalyst to the combined weight of shellac and hydroxypropyl cellulose ranges from about 0.001:1 to 0.1:1;

B. applying the solution to a substrate to form a coated substrate; and

C. heating the coated substrate at a temperature of about 130° to 175° C. for about 2 to 15 minutes whereby the solvent is evaporated to form a cured edible film.

2. The method of claim 1 wherein the solution additionally comprises an edible non-substituted mono- or di-carboxylic organic acid, and wherein the weight ratio of organic acid to the combined weight of shellac and hydroxypropyl cellulose ranges from about 0.001:1 to 0.25:1.

3. The method of claim 2 wherein the weight ratio of the first reactant member to shellac ranges from about 0.05 to 0.1:1.

4. The method of claim 3 wherein the first reactant member is hydroxypropyl cellulose.

5. The method of claim 4 wherein the shellac is virgin shellac.

6. The method of claim 5 wherein the film ranges from about 1 to 5 mil in thickness.

7. The method of claim 6 wherein the organic acid is selected from the group consisting of adipic acid, succinic acid, oleic acid, lauric acid, stearic acid and mixtures thereof and in a weight ratio of second reactant to combined weight of shellac and hydroxypropyl cellulose of about 0.001 to 0.1:1.

8. An edible coating composition having a low water vapor permeability, comprising:

a heat cured reaction product comprising
  A. unbleached, edible shellac, and
  B. a reactant member selected from the group consisting of hydroxypropyl cellulose and hydroxypropyl methyl cellulose and mixtures thereof,
  wherein the ratio of the reactant member and shellac ranges from 0.001 to 2:1,
    and wherein the product has an average molecular weight of at least 2,000.

9. The edible coating composition of claim 8, wherein the reaction product additionally comprises:
  C. a second reactant member comprising a nonsubstituted edible mono- or di-carboxylic organic acid and wherein the weight ratio of second reactant member to combined weight of shellac and first reactant ranges from about 0.0001 to 0.25:1 and wherein the shellac is refined and carbon black decolorized.

10. The edible coating composition of claim 9, additionally comprising:
  D. an acid catalyst member selected from the group consisting of citric, malic, hydrochloric, tartaric acids and mixtures thereof and wherein the weight ratio of acid catalyst member to the combined weight of shellac and first reactant ranges from about 1:10 to 400.

11. The edible coating composition of claim 10 wherein the shellac is virgin shellac, and wherein the first reactant member is hydroxypropyl cellulose.

12. The edible coating composition of claim 11, wherein the weight ratio of shellac to hydroxypropyl cellulose ranges from about 1:0.05 to 0.1, and wherein the second reactant member is selected from the group consisting of stearic, lauric, adipic acids and mixtures thereof.

13. An edible film having a low water vapor permeability, said film comprising:

a heat cured reaction product comprising,
  A. unbleached, edible shellac, and
  B. a first reactant member selected from the group consisting of hydroxypropyl cellulose and hydroxypropyl methyl cellulose and mixtures thereof,
  wherein the ratio of first reactant member and shellac ranges from 0.001 to 2:1, and wherein the product has an average molecular weight of at least 2,000 and wherein the film ranges from 1 to 5 mil in thickness.

14. The edible film of claim 13, wherein the product additionally comprises:
  C. a second reactant member comprising an edible non-substituted mono- or di-carboxylic organic acid, wherein the shellac is refined and carbon black decolorized, and wherein the weight ratio of second reactant member to combined weight of shellac and first reactant range from about 0.0001 to 0.25:1.

15. The edible film of claim 14, wherein the product additionally comprises:
  D. an acid catalyst selected from the group consisting of citric, malic, hydrochloric, tartaric acids and mixtures thereof and wherein the weight ratio of acid catalyst to the combined weight of shellac and first reactant ranges from about 1:10 to 400.

16. The edible film of claim 15 wherein the shellac is virgin shellac, and wherein the first reactant member is hydroxypropyl cellulose.

17. The edible film of claim 16 wherein the weight ratio of shellac to hydroxypropyl cellulose ranges from about 1:0.05 to 0.1, and wherein the second reactant member is selected from the group consisting of strearic, succinic, oleic, lauric, adipic acids and mixtures thereof.

18. A method for preparing a heat sensitive substrate coated with an edible film of low moisture permeability comprising:
  A. heating in a dry state a mixture comprising:
    1. unbleached edible shellac,
    2. a first reactant member selected from the group consisting of hydroxypropyl cellulose, hydroxypropyl methyl cellulose and mixtures thereof, and
    wherein the weight ratio of shellac to member ranges from about 1:0.001 to 1:2,
    in a dry state to a temperature of about 130° to 175° C. for a period of about 2 to 15 minutes, to form a cross-linked reaction product coating composition;
  B. dissolving the coating composition while still molten in a food grade solvent with agitation to form a solution;
  C. applying the solution to a heat sensitive substrate to form a coated substrate; and
  D. drying the coated substrate.

19. The method of claim 18 wherein the solvent is ethanol and wherein the substrate is edible.

20. The method of claim 19 wherein the weight ratio of the first reactant member to shellac ranges from about 0.05 to 0.1:1.

21. The method of claim 20 wherein the first reactant member is hydroxypropyl cellulose.

22. The method of claim 21 wherein the shellac is virgin shellac.

23. The method of claim 22 wherein the film ranges from about 1 to 5 mil in thickness.

24. The method of claim 23 wherein the solution additionally comprises a second reactant member selected from the group consisting of adipic acid, succinic acid, oleic acid, lauric acid, stearic acid and mixtures thereof and in a weight ratio of second reactant to combined weight of shellac and hydroxypropyl cellulose of about 0.0001 to 0.25:1.

25. The product prepared by the method of claim 18.

26. The product prepared by the method of claim 19.

27. The product prepared by the method of claim 22.

28. The product prepared by the method of claim 24.

29. A coated food article comprising:
 A. a food substrate having a surface,
 B. a film overlaying said surface, said film comprising a heat cured thermo-plastic resin product comprising
  1. refined, unbleached, edible shellac, and
  2. a first reactant member selected from the group consisting of hydroxypropyl cellulose and hydroxypropyl methyl cellulose and mixtures thereof,
  wherein the ratio of first reactant member and shellac ranges from 0.001 to 2:1 and wherein the resin product has an average molecular weight of at least 2,000.

30. The article composition of claim 29, wherein the resin additionally comprises:
  3. a second reactant member selected from the group consisting of adipic acid, succinic acid, oleic acid, lauric acid, strearic acid and mixtures thereof and wherein the weight ratio of second reactant member to combined weight of shellac and first reactant ranges from about 0.0001 to 0.25:1.

31. The article of claim 30 wherein the resin additionally comprises:
  4. an acid catalyst selected from the group consisting of citric, malic, hydrochloric, tartaric acids and mixtures thereof and wherein the weight ratio of acid to the combined weight of shellac and first reactant ranges from about 1:10 to 400.

32. The article composition of claim 31 wherein the shellac is virgin shellac, and wherein the first reactant member is hydroxypropyl cellulose.

33. The article composition of claim 32 wherein the weight ratio of shellac to hydroxypropyl cellulose ranges from about 1:0.05 to 0.1, and wherein the second reactant member is selected from the group consisting of stearic, lauric, adipic acids and mixtures thereof.

34. The article of claim 33 wherein the film has a thickness of about 0.1 to 5 mil.

35. A composite food article, resistant to degradation by species migration food phases, comprising:
 A. a first food phase;
 B. a second food phase;
 said composite food article having a gradient between the first and second food phases; and
 C. an interjacent barrier phase comprising a film formed from an edible thermoplastic, heat cured resin, said resin comprising:
  1. about 0.1% to 85% by weight of edible unbleached, refined shellac,
  2. about 25% to 99.9% by weight of a member selected from the group consisting of hydroxypropyl cellulose, hydroxypropyl methyl cellulose and mixtures thereof.

36. The article of claim 35 wherein the gradient is a moisture, acidity, flavor, soluble color, oxygen, oil concentration or protein concentration.

37. The article of claim 36 wherein the first food phase is selected from the group consisting of chocolate chips, muffins, pastry, cereal grains, candy, cookies, nuts, wafer pieces, waffles, pancakes, fruit and mixtures thereo,
 and wherein the second food phase is selected from the group consisting of, frostings, yogurt, ice cream, pudding, cheese, syrups, fruit glazes, fruit fillings, gels, meat emulsions and mixtures thereof.

* * * * *

UNITED STATES PATENT AND TRADEMARK OFFICE
CERTIFICATE OF CORRECTION

PATENT NO. : 4,661,359
DATED : Apr. 28, 1987
INVENTOR(S) : Seaborne et al.

It is certified that error appears in the above-identified patent and that said Letters Patent are hereby corrected as shown below:

Under Foreign Patent Documents
  "43-6435 should be -- 47-6435 --.

Col. 1, line 9   - "ot" should be -- of --.
Col. 3, line 19  - after flow insert -- of penetrant per unit area of membrane per unit time and the --.
Col. 4, line 33  - "otter" should be -- offer --.

Col. 9, line 16  - "realtively" should be -- relatively --.
Col. 12, line 17 - after 5, insert -- grams of stearic acid and 0.1 grams of a concentrated 12 M --.
Col. 16, line 16 - "migration food" should be -- migration between food --.

Col. 16, line 35 - "thereo" should be -- thereof --.

Signed and Sealed this

Sixteenth Day of February, 1988

*Attest:*

DONALD J. QUIGG

*Attesting Officer*        *Commissioner of Patents and Trademarks*